(12) United States Patent
Schafer et al.

(10) Patent No.: US 7,793,628 B2
(45) Date of Patent: Sep. 14, 2010

(54) DEVICE FOR MODIFYING THE CONTROL TIMES OF AN INTERNAL COMBUSTION ENGINE

(75) Inventors: Jens Schafer, Herzogenaurach (DE); Mike Kohrs, Wilthen (DE)

(73) Assignee: Schaeffler KG, Herzogenaurach (DE)

( * ) Notice: Subject to any disclaimer, the term of this patent is extended or adjusted under 35 U.S.C. 154(b) by 499 days.

(21) Appl. No.: 11/721,466

(22) PCT Filed: Nov. 10, 2005

(86) PCT No.: PCT/EP2005/012023

§ 371 (c)(1),
(2), (4) Date: Jun. 12, 2007

(87) PCT Pub. No.: WO2006/074732

PCT Pub. Date: Jul. 20, 2006

(65) Prior Publication Data

US 2009/0288624 A1    Nov. 26, 2009

(30) Foreign Application Priority Data

Dec. 23, 2004    (DE) .................. 10 2004 062 038

(51) Int. Cl.
*F01L 1/34* (2006.01)
(52) U.S. Cl. ............... 123/90.17; 123/90.15; 123/90.31
(58) Field of Classification Search ............. 123/90.15, 123/90.17, 90.31
See application file for complete search history.

(56) References Cited

U.S. PATENT DOCUMENTS

| 1,611,981 A | 12/1926 | Amberg |
| 2002/0017257 A1 | 2/2002 | Axmacher et al. |

FOREIGN PATENT DOCUMENTS

| DE | 2902813 | 8/1979 |
| DE | 10222475 | 12/2003 |
| DE | 102004038681 | 6/2006 |
| GB | 2134208 | 8/1984 |

*Primary Examiner*—Zelalem Eshete
(74) *Attorney, Agent, or Firm*—Volpe and Koenig, P.C.

(57) ABSTRACT

A device (1) which is used to modify the control times of an internal combustion engine (100) is provided. The device (1) includes a drive wheel (13), a drive element (4) and a swashplate mechanism (4). The torque of the crankshaft (101) is transferred via a primary drive to the drive wheel (13) and then, via the swashplate mechanism (2) to the drive element (4) which is secured to the camshaft (11) in a rotationally fixed manner. The configuration of the mounting of the drive wheel (13) on the tooth support (9) of the drive element (4) reduces the axial area of the device (1) due to the construction measures. The invention also relates to an embodiment, wherein the device (1) is fixed to the camshaft (11) by means of a securing screw (12a) without the need for additional space.

3 Claims, 3 Drawing Sheets

DEVICE FOR MODIFYING THE CONTROL TIMES OF AN INTERNAL COMBUSTION ENGINE

BACKGROUND

The invention relates to a device for modifying the control times of gas-exchange valves of an internal combustion engine according to the preambles of Claims 1 and 6.

In internal combustion engines, camshafts are used for actuating the gas-exchange valves. Camshafts are mounted in the internal combustion engine such that cams mounted on these camshafts contact cam followers, for example, cup tappets, rocker arms, or finger levers. If the camshaft is set in rotation, then the cams roll on the cam followers, which in turn actuate the gas-exchange valves. Thus, both the opening period and also the amplitude, as well as the opening and closing times of the gas-exchange valves, are set by the position and the shape of the cams.

Modern engine concepts allow variable valve train designs. On one hand, the valve lift and valve opening period should be made variable up to complete shutdown of individual cylinders. For this purpose, concepts such as switchable cam followers, variable valve trains, or electrohydraulic or electrical valve actuators are provided. Furthermore, it has been shown to be advantageous to be able to influence the opening and closing times of the gas-exchange valves during the operation of the internal combustion engine. It is likewise desirable to be able to influence the opening or closing times of the inlet or outlet valves separately, in order, for example, to be able to selectively set a defined valve overlap. By setting the opening or closing times of the gas-exchange valves depending on the current engine-map range, for example, the current rotational speed or the current load, the specific fuel consumption can be lowered, which has a positive effect on the exhaust-gas behavior and increases the engine efficiency, the maximum torque, and the maximum output.

The described variability in the gas-exchange valve time control is implemented through a relative change of the phase position of the camshaft relative to the crankshaft. Here, the camshaft is usually in a driven connection with the crankshaft via a chain drive, belt drive, gearwheel drive, or equivalent drive concepts. Between the chain drive, belt drive, or gearwheel drive driven by the crankshaft and the camshaft there is a camshaft adjuster, which transmits the torque from the crankshaft to the camshaft. Here, this device for modifying the control times of the internal combustion engine is constructed such that during the operation of the internal combustion engine, the phase position between the crankshaft and camshaft is held reliably and, if desired, the camshaft can be rotated within a certain angular range relative to the crankshaft.

In internal combustion engines with separate camshafts for the intake and exhaust valves, these can each be equipped with a camshaft adjuster. Therefore, the opening and closing times of the intake and exhaust gas-exchange valves can be shifted in time relative to each other and the valve overlaps are set selectively.

The seat of modern camshaft adjusters is generally located on the drive-side end of the camshaft. It is comprised of a crankshaft-fixed drive wheel, a camshaft-fixed driven element, and an adjustment mechanism transmitting the torque from the drive wheel to the driven part. The drive wheel can be constructed as a chain, belt, or gearwheel and is locked in rotation with the crankshaft by means of a chain, belt, or gearwheel drive. The adjustment mechanism can be operated electromagnetically, hydraulically, or pneumatically. Mounting the camshaft adjuster on an intermediate shaft or supporting it on a non-rotating component is similarly conceivable. In this case, the torque is transmitted via additional drives to the camshaft.

Electrically operated camshaft adjusters are comprised of a drive wheel, which is in driven connection with the crankshaft of the internal combustion engine, a driven part, which is in driving connection with a camshaft of the internal combustion engine, and adjustment gearing. The adjustment gearing involves a triple-shaft gear mechanism, with three components rotating relative to each other. Here, the first component of the gearing is locked in rotation with the drive wheel and the second component is locked in rotation with the driven part. The third component is constructed, for example, as a toothed component, whose rotational speed can be regulated via a shaft, for example, by means of an electric motor or a braking device.

The torque is transmitted from the crankshaft to the first component and from there to the second component and thus to the camshaft. This happens either directly or under intermediate connection of the third component.

Through suitable regulation of the rotational speed of the third component, the first component can be rotated opposite the second component and thus the phase position between the camshaft and crankshaft can be changed. Examples for such triple-shaft gear mechanisms are internal eccentric gear mechanisms, double-internal eccentric gear mechanisms, shaft gear mechanisms, swashplate gear mechanisms, or the like.

For controlling the camshaft adjuster, sensors detect the characteristic data of the internal combustion engine, for example, the load state, the rotational speed, and the angular positions of the camshaft and crankshaft. This data is fed to an electronic control unit, which controls the adjustment motor of the camshaft adjuster after comparing the data with an engine-map range of the internal combustion engine.

From DE 102 22 475 a device for modifying the control times of an internal combustion engine is known, in which the torque transfer from the crankshaft to the camshaft and the adjustment process are realized by means of a swashplate gear mechanism. The device essentially comprises a camshaft-fixed driven element and a swashplate. The device further has a drive wheel, which is in driven connection with a crankshaft and is constructed in one piece with a housing. The swashplate is provided with four pins engaging in elongated holes of the housing. The torque of the crankshaft is transmitted via the drive wheel, the housing, and the pins to the swashplate.

The device further has an adjustment shaft, which is driven, for example, by an electric motor and on which the swashplate is supported at a defined contact angle.

The swashplate is provided on its axial side surface facing the driven element with conical gearwheel teeth and arranged at a certain contact angle to the driven element, such that an angle segment of the teeth of the swashplate engages in an angle segment of conical gearwheel teeth constructed on the driven element. Here, there is a difference in the number of teeth in the conical gearwheels.

A rotation of the adjustment shaft relative to the driven element leads to a wobbling rotation of the swashplate and thus to a rotation of the engaged angle segment relative to the driven element. Due to the difference in the number of teeth of the conical gearwheels, this leads to relative rotation of the camshaft relative to the crankshaft.

The drive wheel or the housing is supported on an axial shoulder of the driven element so that it can rotate relative to this element. The conical gearwheel teeth of the driven element are constructed on a teeth carrier, wherein the teeth carrier is mounted before the shoulder in the axial direction. The teeth carrier and a cover screwed to the drive wheel form an axial bearing for the drive wheel or the housing. Here, the cover is fixed in the axial direction by the driven element on one side and by the camshaft on the other side.

The construction of a bearing shoulder on the driven element and the teeth carrier arranged offset axially to this element lead to a relatively large need for axial installation space for the device and to a complex geometrical shape for the driven element.

Furthermore, the driven element is locked in rotation with the camshaft by means of an attachment screw. The screw head engages from the side facing away from the camshaft through the device, wherein its threads engages in complementary internal threads constructed in the camshaft. The screw head exerts a force on the driven element, whereby this is fixed to the camshaft.

The screw head is used simultaneously as the race for the cylinder bodies of a needle bearing, by means of which the adjustment shaft is supported on the screw head. In order to be able to be used as the race for the needle bearing, the screw head must be subjected to a hardening process, wherein care must be taken that the threaded section is not hardened. Such hardening processes are complicated and expensive. Simultaneously, the solid screw head leads to a high mass and thus to a high inertia of the arrangement.

SUMMARY

The invention is based on the objective of creating a device for modifying the control times of gas-exchange valves of an internal combustion engine, wherein the axial installation space requirements and the mass of the device are reduced and the production costs are to be reduced.

In a first embodiment of a device for modifying the control times of gas-exchange valves of an internal combustion engine with a drive wheel in driven connection with a crankshaft and with a swashplate gear mechanism, which has a housing and a driven element in driving connection with a camshaft, wherein a radially outer ring section of the driven element is constructed as a teeth carrier, wherein a toothed carrier is constructed on an axial side surface of the teeth carrier and wherein the drive wheel or the housing is supported on the drive element so that it can rotate relative to the drive element. According to the invention, the objective is met in that an outer casing surface of the teeth carrier is used as a radial bearing surface for the housing or the drive wheel.

In the embodiment according to the invention, the device is comprised of a drive wheel constructed as a belt, chain, or gearwheel and a swashplate gear mechanism. Among other things, the swashplate gear mechanism comprises a housing, which is locked in rotation with the drive wheel, a swashplate, a driven element, which is locked in rotation with a camshaft, and an adjustment shaft, which is driven, for example, by means of an electric motor. The housing can be constructed in one piece with the drive wheel or can be connected with this with a firmly bonded, positive, or form fit. Torque is transmitted from the crankshaft to the drive wheel and thus to the housing via a belt, chain, or gearwheel drive. The housing is actively connected by means of a pin coupling or a toothed component with the swashplate. As a toothed component, for example, a conical gearwheel is conceivable, which is constructed in one piece with the housing or is connected to the housing by means of attachment means. The pin coupling or the toothed component transmits the torque transmitted by the crankshaft to the drive wheel to the swashplate, which is supported on an adjustment shaft. The swashplate is arranged on an adjustment shaft at a defined contact angle relative to the driven element.

A toothed ring running in the peripheral direction is constructed on an axial side surface of the swashplate. Furthermore, a ring-shaped, radially outer area of the driven element is constructed as a teeth carrier, on which a toothed ring is also formed. The toothed ring of the swashplate engages along a peripheral-side angle segment in the toothed ring of the driven element.

The crankshaft torque is transmitted via the drive wheel, the housing, the pin coupling, or the toothed component to the swashplate and from there to the driven element and finally to the camshaft. The toothed rings of the swashplate and the driven element or the swashplate and the toothed component, or both gear pairs, have different numbers of teeth. If the adjustment shaft rotates at the rotational speed of the drive wheel, then the phase position between the crankshaft and the camshaft is maintained. If there is a difference between the rotational speed of the adjustment shaft and the rotational speed of the drive wheel, then the phase position between the camshaft and the crankshaft is changed. Here, the housing and the drive wheel rotate relative to the driven element, which supports the housing or the drive wheel in the radial direction.

By supporting the drive wheel or the housing on the outer casing surface of the teeth carrier, the necessity of providing the driven element with an axial shoulder is eliminated, whereby the axial installation space of the swashplate gear mechanism can be reduced considerably.

In one actual implementation of the invention, the toothed ring transitions in the radial direction outwardly into a ring-shaped bearing section, which has a closed outer casing surface.

In this embodiment, a ring-shaped edge connects to the toothed ring at the outside in the radial direction, which is used as a radial bearing surface for the drive wheel or the housing. The edge forms in the peripheral direction a closed bearing surface without interruption, which aids the construction of a hydrodynamic lubricating film.

The production of the teeth of the toothed ring is possible, for example, by means of wobble pressing, axial rolling, milling, or sintering.

Alternatively, it can be provided that the teeth of the toothed ring extend in the radial direction up to the radial bearing surface. The teeth intersect the bearing surface in this case. Through correspondingly rounded edge geometries, the necessary bearing capacity and wear resistance can be achieved. This embodiment has the advantage of lower production costs.

In one advantageous improvement of the invention, it is provided that the axial surface of the teeth carrier facing away from the toothed ring in the axial direction forms a first axial bearing surface for axial bearing of the housing or the drive wheel.

In this embodiment, the driven element or the housing is constructed with a projection, which extends radially inwards and which contacts the axial side surface of the driven element facing away from the toothed ring in the area of the teeth carrier. The projection advantageously involves a ring-shaped element, which extends on an axial side surface of the drive wheel or the housing. Thus it is guaranteed that axial forces acting on the drive wheel or the housing and directed away from the camshaft are received by the driven element. The projection can be constructed in one piece with the driven wheel or the housing or produced separately and fixed to the drive wheel or to the housing. The projection is advantageously constructed with a ring shape extending around the entire device. In this case, additional functions can be integrated into the ring-shaped projection, for example, a rotational angle limiter of the drive wheel relative to the driven element. For this purpose, the ring-shaped projection can be constructed with an additional projection, which engages in a connecting rod in the driven element. Alternatively, the ring-shaped projection can be provided on its radially inner end with a recess, in which a projection constructed or fixed on the driven element engages.

In the case of small rotating moments about the radial bearing position of the housing or the driven wheel, axial forces to be directed to the camshaft can be supported by means of the gear pair between the swashplate and the toothed component.

Furthermore, it can be provided that the toothed ring-side axial side surface of the ring-shaped bearing section forms a second axial bearing surface for axial bearing of the housing or the drive wheel.

In this case, an additional projection extending radially inwards is provided on the housing or on the drive wheel, which is supported in the axial direction on the ring-shaped edge of the teeth carrier.

In this way, it is possible, similar to the embodiment in the state of the art, to construct both the radial and also the axial bearing positions on the components of the driven element and drive wheel or housing, possibly including a stop plate, wherein the axial installation space requirements are reduced considerably.

In a second embodiment of a device for modifying the control times of gas-exchange valves of an internal combustion engine with a swashplate gear mechanism, wherein the swashplate gear mechanism comprises at least one swashplate, which is supported on an adjustment shaft, the objective of the invention is met in that the adjustment shaft is supported on a hollow shaft, wherein the hollow shaft is locked in rotation with the camshaft by means of an attachment screw and a radially inwardly extending collar, on which a screw head of the attachment screw is supported, is constructed on an inner casing surface of the hollow shaft.

In an advantageous refinement of the invention, it is provided that the collar is arranged such that the screw head, in the assembled state of the device, is arranged on the camshaft completely within the hollow shaft.

The adjustment shaft is supported in this embodiment on a hollow shaft, preferably by means of a rolling bearing. An outer casing surface of the hollow shaft is used as an inner running surface for the cylinder bodies of the rolling bearing. Furthermore, the hollow shaft is connected to the camshaft by means of an attachment screw, wherein the driven element is included in the clamping connection and is likewise fixed to the camshaft. Here, the screw head of the attachment screw is supported on a collar constructed in the interior of the hollow shaft. By supporting the adjustment shaft on a hollow shaft, the weight of the device is reduced considerably. The hollow shaft can be further produced cost effectively in a non-cutting shaping process, for example, as a sintered or molded sheet part. This reduces the costs of the device in comparison with the embodiment from the state of the art, because expensive special screws can be eliminated.

In this embodiment, the collar is constructed so that the forces, which are exerted by the attachment screw on the hollow shaft and which are produced due to the tightening moment in the assembly of the device on the camshaft, are led at least to a great degree to the rolling bearings, which support the adjustment shaft relative to the hollow shaft. For this purpose it is necessary to arrange the collar as close as possible to the device-side end of the camshaft within the hollow shaft. This has the consequence that the screw head of the attachment screw, which transmits the clamping force to the hollow shaft, is arranged completely within the hollow shaft and thus contributes nothing to the installation length of the device.

Another advantage of this embodiment relative to an embodiment, in which the screw head attaches to the end of the hollow shaft facing away from the camshaft, lies in that expansion of the hollow shaft is prevented. If the screw head contacts the end of the hollow shaft away from the camshaft, then this lies within the clamping connection of the attachment screw on its entire axial length. This has the consequence that the hollow shaft is flattened and bulges. The bulging of the hollow shaft leads to a reduction in the bearing play of the rolling bearing arranged on it or to seizing of the slide bearing, whereby higher friction occurs in the device and in the worst case it becomes non-functional.

Furthermore, the clamping force generates high tensions in the hollow shaft, whereby plastic deformations occur in this event. Due to the undesired plastic deformations, automated mounting of the device on the camshaft becomes more difficult, because a defined end of the mounting process cannot be detected by the mounting device due to the setting force losses.

These disadvantages do not occur or only occur to a much lower extent in the embodiment according to the invention.

Furthermore, the attachment screw can be shorter and thus lighter, whereby the mass and the inertia of the device is further reduced.

BRIEF DESCRIPTION OF THE DRAWINGS

Additional features of the invention emerge from the following description and the associated drawings, in which embodiments of the invention are shown schematically. Shown are.

DETAILED DESCRIPTION OF THE PREFERRED EMBODIMENTS

Figure 1:
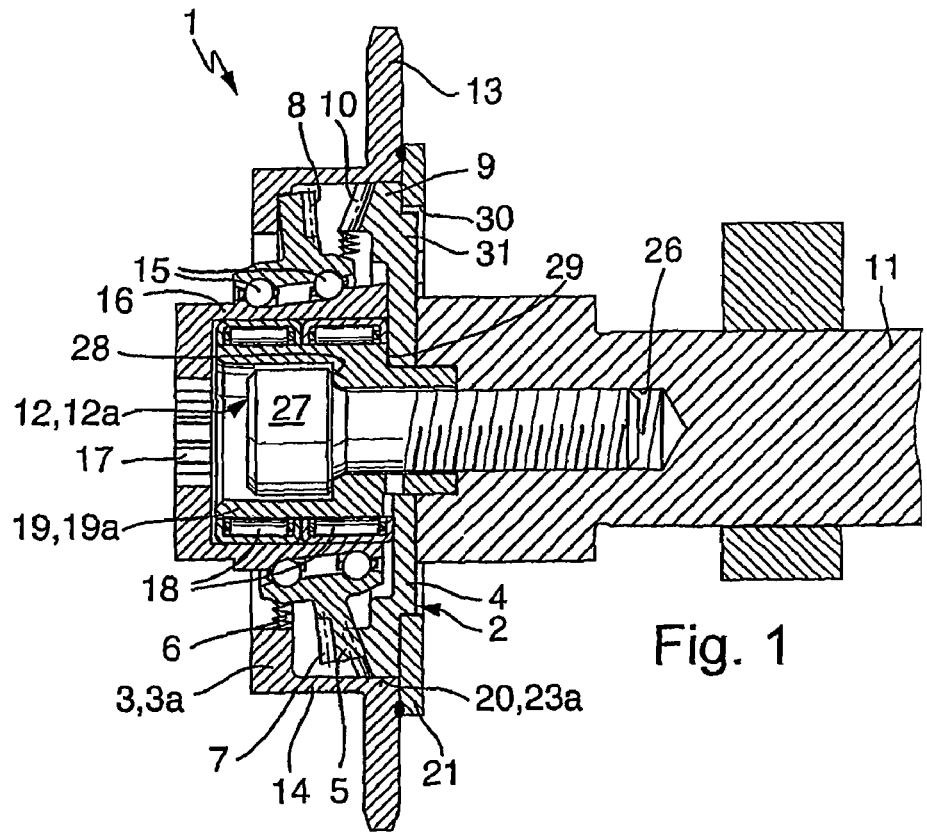
FIG. 1 a longitudinal cross-sectional view through a first embodiment according to the invention of a device for modifying the control times of gas-exchange valves of an internal combustion engine, FIG. 2 a longitudinal cross-sectional view through a second embodiment according to the invention for a device for modifying the control times of gas-exchange valves of an internal combustion engine, FIG. 3 a longitudinal cross-sectional view through a third embodiment according to the invention for a device for modifying the control times of gas-exchange valves of an internal combustion engine, FIG. 4 a longitudinal cross-sectional view through a fourth embodiment according to the invention for a device for modifying the control times of gas-exchange valves of an internal combustion engines, FIG. 5, a longitudinal cross-sectional view through a fifth embodiment according to the invention for a device for modifying the control times of gas-exchange valves of an internal combustion engine.
Figure 1A:
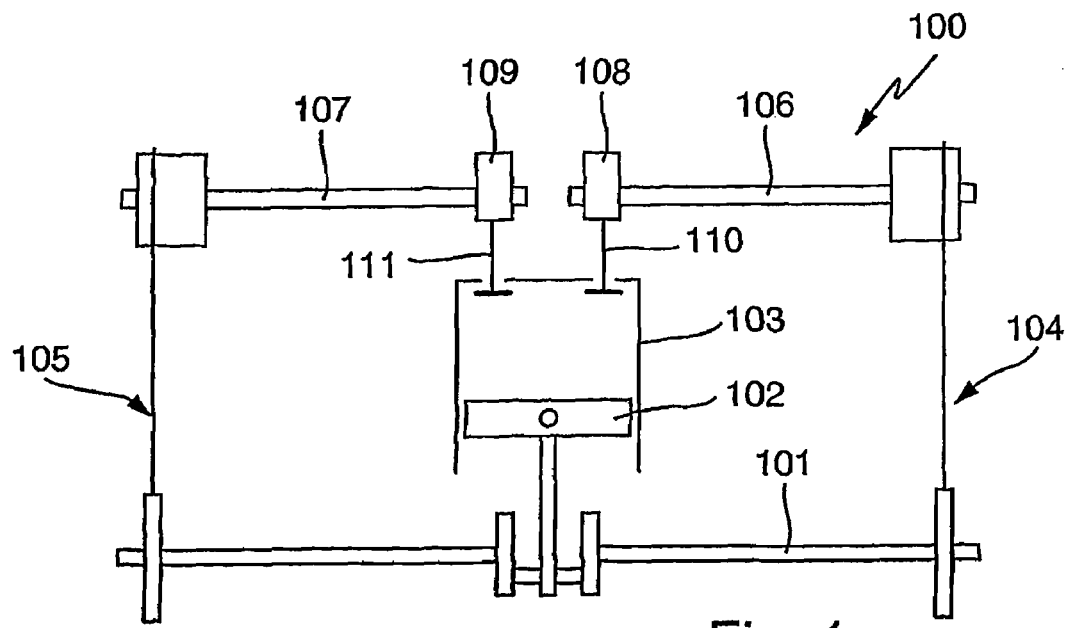
FIG. 1a a view of an internal combustion engine, only very schematically.

In FIG. 1a, a schematic of an internal combustion engine 100 is shown, wherein a piston 102 sitting on a crankshaft 101 is shown in a cylinder 103. The crankshaft 101 is connected in the shown embodiment via a power-transmission means drive 104 and 105 to an intake camshaft 106 and exhaust camshaft 107, respectively, wherein first and second devices 1 can provide for a relative rotation between the crankshaft 101 and camshafts 106, 107. Cams 108, 109 of the camshafts 106, 107 actuate an intake gas-exchange valve 110 and the exhaust gas-exchange valve 111, respectively.

FIG. 1 shows an embodiment of a device 1 according to the invention for modifying the control times of an internal combustion engine 100. The device 1 comprises, among other things, a swashplate gear mechanism 2 comprised of a toothed component 3a, a driven element 4, and a swashplate 5. The toothed component 3a is constructed in the shown embodiment as a conical gearwheel 3. A first toothed ring 6 constructed as conical gearwheel teeth is formed on an axial side surface of the conical gearwheel 3. Furthermore, on the axial side surfaces of the swashplate 5 there is a second and a third toothed ring 7, 8, wherein the toothed rings 7, 8 in this embodiment are each constructed similarly as conical gearwheel teeth. Here, the second toothed ring 7 is constructed on the axial side surface facing the conical gearwheel 3 and that of the toothed ring 8 is constructed on the axial side surface of the swashplate 5 facing the driven element 4. The radial outer section of the driven element 4 is constructed as toothed carrier 9, on whose axial side surface facing the swashplate 5 there is a fourth toothed ring 10. The fourth toothed carrier 10 is constructed in this embodiment likewise as conical gearwheel teeth.

The driven element 4 is locked in rotation with a camshaft 11. The connection between the driven element 4 and camshaft 11 is realized in the shown embodiment by means of a first attachment means 12, here an attachment screw 12a. Firmly bonded, positive, friction, or form fit connection methods are also conceivable.

A drive wheel 13 is in active connection with a not-shown primary drive, by means of which a torque is transmitted from the crankshaft 101 to the drive wheel 13. Such a primary drive can be, for example, a chain, belt, or gearwheel drive. The drive wheel 13 is locked in rotation with a housing 14, and the housing 14 is in turn locked in rotation with the conical gearwheel 3. In the embodiment shown in FIG. 1, these are constructed in one piece. Alternatively, the housing 14 can be connected to the conical gearwheel 3 and/or to the drive wheel 13 with a firmly bonded, positive, friction, or form fit.

The conical gearwheel 3 and the driven element 4 are parallel to each other and are spaced apart in the axial direction. Together with the housing 14, the conical gearwheel 3 and the driven element 4 form a ring-shaped hollow space, in which the swashplate 5 is arranged. By means of first rolling bearings 15, the swashplate 5 is supported at a defined contact angle to the conical gearwheel 3 and the driven element 4 on an adjustment shaft 16. The essentially pot-shaped adjustment shaft 16 is provided with a coupling element 17, in which a not-shown shaft of a similarly not-shown device engages, with which the rotational speed of the adjustment shaft 16 can be regulated. The adjustment shaft 16 is supported by means of a second rolling bearing 18 on a shaft 19a locked in rotation with the camshaft 11 and constructed in the present embodiment as a hollow shaft 19.

The swashplate 5 arranged at a defined contact angle on the adjustment shaft 16 engages with the second toothed ring 7 in the first toothed ring 6 of the conical gearwheel 3 and with the third toothed ring 8 in the fourth toothed ring 10 of the driven element 4. Here, the toothed rings 6, 7, 8, 10 engage only at a certain angular range, wherein the size of the angular range is dependent on the contact angle of the swashplate 5.

By means of the engagement of the toothed rings 6, 7, 8, 10, the torque of the crankshaft 101 transmitted by the primary drive to the drive wheel 13 and from there to the conical gearwheel 3 is transmitted via the swashplate 5 to the driven element 4 and thus to the camshaft 11.

In order to maintain the phase position between the camshaft 11 and crankshaft 101, the adjustment shaft 16 is driven at the rotational speed of the drive wheel 13. If the phase position is changed, then the rotational speed of the adjustment shaft 16 increases or decreases depending on whether the camshaft 11 advances or lags relative to the crankshaft 101. Through the different rotational speed of the adjustment shaft 16, the swashplate 5 executes a wobbling rotation, wherein the angular ranges, in which the toothed rings 6, 7, 8, 10 engage each other, run around the swashplate 5, the conical gearwheel 3, and the driven element 4. In at least one of the toothed ring pairs 6, 7, 8, 10, the two intermeshing toothed rings 6, 7, 8, 10 have different numbers of teeth. If the angular ranges, in which the toothed rings 6, 7, 8, 10 intermesh, have completed one run, then an adjustment of the conical gearwheel 3 relative to the driven element 4 and thus the camshaft 11 relative to the crankshaft 101 is produced due to the difference in the number of teeth. The adjustment angle corresponds to the area that the teeth forming the difference in the number of teeth enclose.

In this connection, it is conceivable that the toothed rings 6, 7, 8, 10 of both toothed ring pairs have different numbers of teeth. Thus, the adjustment conversion ratio is given from the two resulting difference ratios.

It is likewise conceivable that the toothed rings 6, 7, 8, 10 have only one toothed ring pair with different numbers of teeth. The conversion ratio in this case is given only based on this speed reduction. The other toothed ring pair is used in this case only as coupling means with a speed-reduction ratio of 1:1 between the swashplate 5 and the corresponding component 3, 4.

During the adjustment process, the drive wheel 13 or the housing 14 rotates according to the conversion ratio and the rotational speed of the adjustment shaft 16 to the driven element 4. The drive wheel 13 or the housing 14 is supported on an outer casing surface 20 of the teeth carrier 9. Therefore, the formation of an axial shoulder on the driven element 4, as provided in DE 102 22 475 A1, is eliminated. This leads to a lower axial installation length of the swashplate gear mechanism 2 and thus the device 1.

In the embodiment shown in FIG. 1, the teeth of the fourth toothed ring 10 extend along the entire length of the teeth carrier 9 and thus partially interrupt the outer casing surface 20 of the teeth carrier 9 formed as radial bearing surface 23a. Also conceivable is to allow the teeth of the fourth toothed ring 10 to transition in the radial direction outwards into a ring-shaped bearing section 23, whereby the outer casing surface 20 of the teeth carrier 9 is formed as an uninterrupted radial bearing surface 23a.

Furthermore, in the shown embodiment there is a stop plate 21, which is connected with a positive, friction, firmly bonded, or form fit with the drive wheel 13 or the housing 14. Also conceivable is an attachment of the stop plate 21 with one of the two components 13, 14 by means of a screw connection.

The stop plate 21 extends in the radial direction farther inwards than the drive wheel 13 or the housing 14 and is arranged such that an axial side surface of the stop plate 21 contacts the axial side surface of the driven element 4 facing away from the fourth toothed ring 10 in the area of the teeth carrier 9. Thus, the stop plate 21 interacting with the teeth carrier 9 forms an axial bearing for the drive wheel 13 and the housing 14, which receives axial forces acting on these components 13, 14 in the direction away from the camshaft 11.

If smaller tilting moments act on the drive wheel 13, then axial forces acting on the drive wheel 13 in the direction of the camshaft 11, as shown in FIG. 1, are supported on the conical gearwheel 3 and the swashplate 5 by means of the engaged toothed rings 6, 7. Thus, both the radial and also axial support of the drive wheel 13 and the housing 14 is guaranteed, wherein the axial installation space requirements of the swashplate gear mechanism 2 are reduced considerably.

Figure 2:
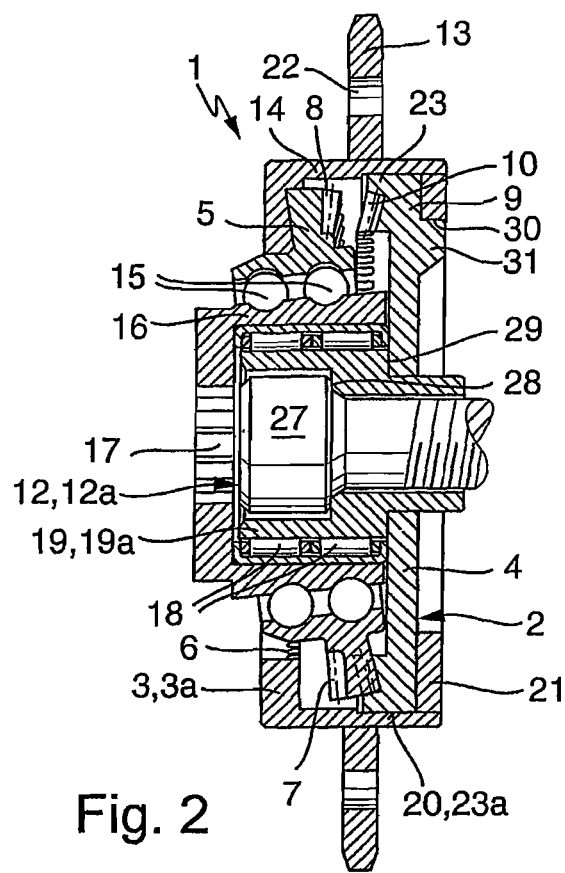

FIG. 2 shows another embodiment according to the invention for a device 1. The devices 1 shown in FIGS. 1 and 2 are essentially identical. In contrast with the embodiment shown in FIG. 1, in the embodiment shown in FIG. 2 the drive wheel 13 and the housing 14 are not constructed in one piece. Instead these involve separate components, which are connected to each other with a positive, firmly bonded, friction, or form fit. Also conceivable would be a connection of the two components by means of a screw connection. The drive wheel 13 is provided with elongated holes 22 oriented on the peripheral side, in order to reduce the mass and thus the inertia of the device 1.

As in the first embodiment, here the housing 14 and thus the drive wheel 13 are supported on the teeth carrier 9 of the driven element 4. In contrast with the first embodiment, the teeth of the fourth toothed ring 10 do not extend up to the radial bearing surface 23a, but instead transition into a ring-shaped bearing section 23. Therefore, a closed radial bearing surface 23a is created, on which the housing 14 is rotatably supported.

As in the first embodiment, a stop plate 21, which acts with the driven element 4 as an axial stop for the housing 14, is mounted on the housing 14. Axial forces acting on the drive wheel 13 in the direction of the camshaft 11 are in turn supported on the conical gearwheel 3 and the swashplate 5, in turn, by means of the two toothed rings 6, 7.

Figure 3:
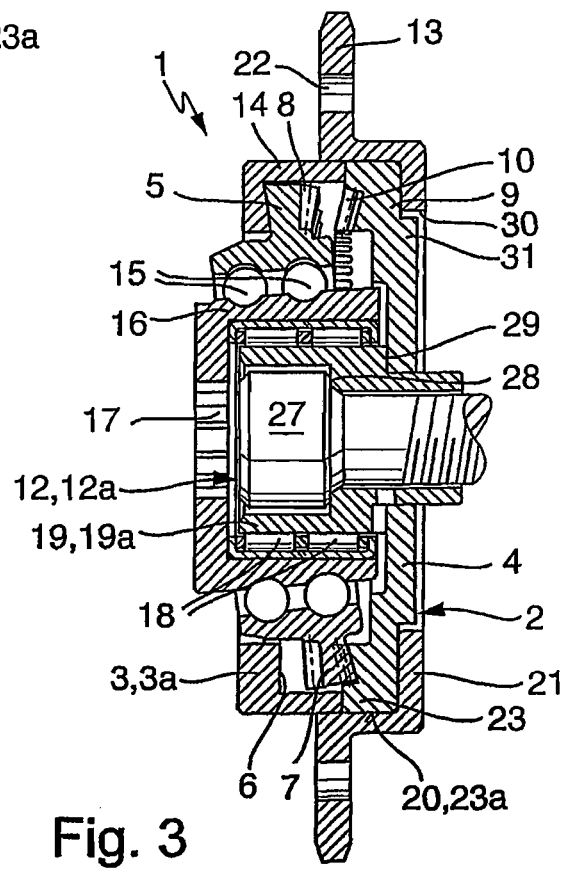

FIG. 3 shows a third embodiment according to the invention for the device 1, wherein in this embodiment the drive wheel 13 is constructed in one piece with the stop plate 21. The drive wheel 13 is in turn supported radially on the outer casing surface 20 of the teeth carrier 9. The axial support is in this case guaranteed on one side by the interaction of the stop plate 21 and an axial side surface of the driven element 4 and on the other side by means of the housing 14 and the toothed ring-side axial side surface of the teeth carrier 9 of the driven element 4. The drive wheel 13 and the housing 14 are locked in rotation with each other in this embodiment, wherein positive, firmly bonded, friction, or form fit connections can be used. Also conceivable would be a screw connection of both components.

Through the construction of an additional axial bearing position between the housing 14 and the teeth carrier 9 of the driven element 4, axially directed forces, which act in the direction of the camshaft 11 on the drive wheel 13, are no longer supported on the toothed rings 6, 7 of the conical gearwheel 3 and the swashplate 5. Therefore, larger tilting moments acting on the drive wheel 13 can also be supported with a reliable function without also loading the toothed rings 6, 7. Therefore, the teeth lash of the toothed rings 6, 7 is not negatively affected, which leads to improved efficiency, and seizing of the device 1 can be avoided.

Figure 4:
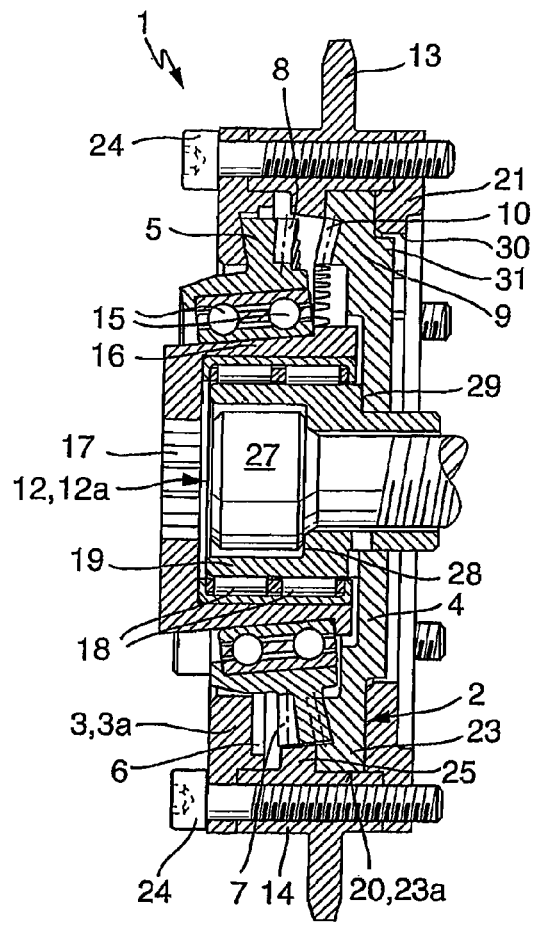
Figure 5:
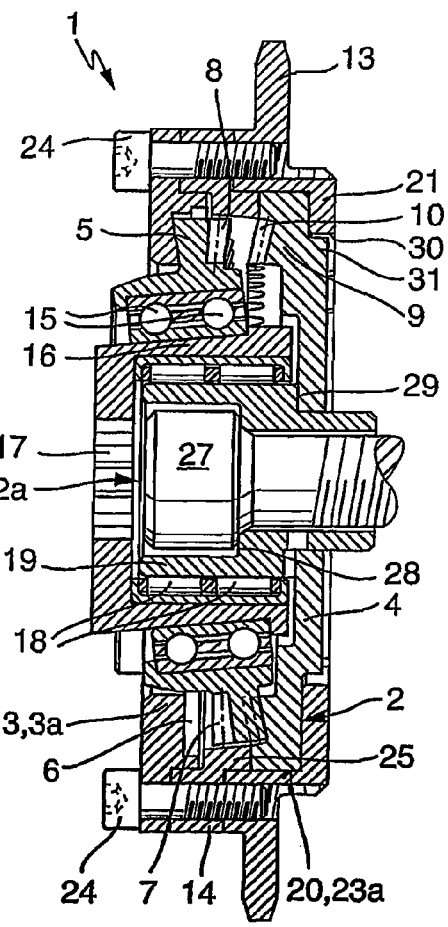

Similar concepts as in the third embodiment are shown in FIGS. 4 and 5. In FIG. 4, the housing 14 is formed in one piece with the drive wheel 13, while the conical gearwheel 3 and the stop plate 21 are produced separately. The three components are connected to each other by means of second attachment means 24. In the shown embodiment, this involves a screw connection. The housing 14 is in turn supported radially on an outer casing surface 20 of the teeth carrier 9 of the driven element 4. As an axial bearing, the stop plate 21, which interacts with an axial side surface of the driven element 4, is used in turn on one side. On the other side of the driven element 4, this interacts in the area of the teeth carrier 9 with a radially inwards extending projection 25 of the housing 14.

The embodiment in FIG. 5 is essentially identical to that in FIG. 4, with the exception that the drive wheel 13 is formed in one piece with the stop plate 21 and the housing 14 is shown as a separate component.

The radial projections 25 of the embodiments shown in FIGS. 4 and 5 have a ring shape, whereby the housing 14 is supported axially by means of a ring-shaped surface relative to the driven element 4. Conceivable in connection with this are also projections 25, which are formed only in defined angle segments of the housing 14, which leads to a reduction in mass of the device 1.

FIGS. 1 to 5 show another aspect of the invention. In the shown embodiments, the swashplate 5 is supported by means of second rolling bearing 18 on a hollow shaft 19. The hollow shaft 19 and the driven element 4 are locked in rotation on the camshaft 11 by means of an attachment screw 12a. The attachment screw 12a engages with its threaded section in a hollow space 26 provided with internal threads in the camshaft 11. A screw head 27 contacts a collar 28 formed on the inner casing surface of the hollow shaft 19 and charges this with a clamping force directed towards the camshaft 11. The hollow shaft 19 forwards the clamping force to the driven element 4, which is supported on the camshaft 11. For this purpose, the hollow shaft 19 is provided in the shown embodiments with a step 29, so that the driven element 4 is pressed by the step 29 onto the camshaft 11.

The collar 28 is advantageously formed in the axial direction in the direct surroundings of the step 29. Here, embodiments are imaginable, in which the collar 28 is formed in the axial direction between the step 29 and the camshaft 11 or, as shown in the figures, on the side of the step 29 facing away from the camshaft.

Through the construction of the collar 28 within the hollow shaft 19 in the area of the step 29, the entire screw head 27 is located within the hollow shaft 19, whereby this does not increase the axial installation length of the device 1. In comparison with an embodiment, in which the screw head 27 contacts the side of the hollow shaft facing away from the camshaft, in this embodiment, stresses are largely prevented in the material of the hollow shaft 19, which could lead to its expansion. This is especially important for the area of the races of the cylinder bodies. Therefore, it is guaranteed that the operating play of the second rolling bearing 18 is not reduced. Furthermore, the degree of plastic deformation of the hollow shaft 19 is decreased, whereby automated mounting is allowed.

The use of a hollow shaft 19 as an inner raceway for the cylinder bodies of the second rolling bearing 18 leads to a significant reduction of the rotating masses in comparison with the embodiment in the state of the art. Furthermore, expensive special screws can be eliminated, whose screw heads are used as raceways. Such screws would have to be subjected to complicated and expensive hardening processes, wherein hardening of the threaded section would have to be avoided. In contrast, the hollow shaft can be formed as an economical and easy to produce molded sheet part. Alternatively, sintered components or the like are also conceivable.

In FIGS. 1 to 5, a stop plate 21 is provided on the end of the device 1 facing the camshaft. In FIGS. 1, 2, and 4, this is constructed as a separate component, which is fixed to the drive wheel 13 or the housing 14 with a positive, firmly bonded, friction, or form fit or by means of a screw connection. In FIGS. 3 and 5, this is constructed in one piece with the drive wheel 13. The stop plate 21 forms a part of a rotational angle limiter in the shown embodiments. Here, the radially inner, ring-shaped casing surface of the stop plate 21 is provided with at least one recess 30 running in the peripheral direction, in which a tab 31 formed on the driven element 4 engages. The recess 30 extends in the peripheral direction over an angle segment, which corresponds to the maximum permissible adjustment angle plus the angle extent of the tab 31. The tab 31 can be constructed in one piece with the driven element 4 or can be comprised of a separate component, which is fixed on the driven part 4. Also conceivable is forming the tabs 31 on the stop plate 21 and the recess 30 on the driven element 4. Also conceivable is providing several recesses 30, in each of which one tab 31 engages.

If the phase position of the camshaft 11 relative to the crankshaft 101 changes, the relative position of the tab 31 in the recess 30 also changes. In the extreme case, the tab 31 comes into contact with a radial wall of the recess 30, whereby further adjustment of the phase position is effectively prevented in this direction.

LIST OF REFERENCE NUMBERS

1 Device
2 Swashplate gear mechanism
3 Conical gearwheel
3a Component
4 Driven element
5 Swashplate
6 First toothed ring
7 Second toothed ring
8 Third toothed ring
9 Teeth carrier
10 Fourth toothed ring
11 Camshaft
12 First attachment means
12a Attachment screw
13 Drive wheel
14 Housing
15 First rolling bearing
16 Adjustment shaft
17 Coupling element
18 Second rolling bearing
19 Hollow shaft
19a Shaft
20 Outer casing surface
21 Stop plate
22 Elongated holes
23 Bearing section
23a Radial bearing surface
24 Second attachment means
25 Projection
26 Hollow space
27 Screw head
28 Collar
29 Step
30 Recess
31 Tab
100 Internal combustion engine
101 Crankshaft
102 Piston
103 Cylinder
104 Power-transmission means drive
105 Power-transmission means drive
106 Intake camshaft
107 Exhaust camshaft
108 Cam
109 Cam
110 Inlet gas-exchange valve
111 Outlet gas-exchange valve

The invention claimed is:

1. Device for modifying the control times of gas-exchange valves of an internal combustion engine comprising a drive wheel in driven connection with a crankshaft and with a swashplate gear mechanism, which has a housing and a driven element in driving connection with a camshaft, a radial outer ring section of the driven element is constructed as a teeth carrier, a toothed ring is formed on an axial side surface of the teeth carrier and a drive wheel or the housing is supported on the driven element so that it can rotate relative to the driven element, an outer casing surface of the teeth carrier is used as a radial bearing surface for the housing or the drive wheel, and teeth of the toothed ring extend in a radial direction up to the radial bearing surface.

2. Device for modifying the control times of gas-exchange valves of an internal combustion engine comprising a drive wheel in driven connection with a crankshaft and with a swashplate gear mechanism, which has a housing and a driven element in driving connection with a camshaft, a radial outer ring section of the driven element is constructed as a teeth carrier, a toothed ring is formed on an axial side surface of the teeth carrier and a drive wheel or the housing is supported on the driven element so that it can rotate relative to the driven element, an outer casing surface of the teeth carrier is used as a radial bearing surface for the housing or the drive wheel, and the toothed ring transitions in a radial direction outwardly into a ring-shaped bearing section, which has a closed outer casing surface.

3. Device according to claim 2, wherein a toothed ring-side axial side surface of the ring-shaped bearing section forms a second axial bearing surface for axial supporting of the housing or the drive wheel.

* * * * *